United States Patent [19]

Narula et al.

[11] Patent Number: 5,234,881
[45] Date of Patent: Aug. 10, 1993

[54] BINARY LA-PA OXIDE CATALYST AND METHOD OF MAKING THE CATALYST

[75] Inventors: Chaitanya K. Narula, Ann Arbor, Mich.; William L. H. Watkins, Toledo, Ohio; Mohinder S. Chattha, Northville, Mich.

[73] Assignee: Ford Motor Company, Dearborn, Mich.

[21] Appl. No.: 894,703

[22] Filed: Jun. 5, 1992

[51] Int. Cl.$^5$ .......................... B01J 23/10; B01J 23/44
[52] U.S. Cl. ................................. 502/262; 502/303; 424/213.5
[58] Field of Search ................. 502/262, 303; 423/593

[56] References Cited

U.S. PATENT DOCUMENTS 4,127,510 11/1978 Harrison et al. ..................... 252/462
4,182,694 1/1980 Lauder ................................. 502/303

FOREIGN PATENT DOCUMENTS 61-209045 9/1986 Japan ................................. 502/303

OTHER PUBLICATIONS

Acta Crystallography, vol. B44, p. 563, 1988, Attfield.
Journal Solid State Chem., vol. 80, p. 286, 1989, Attfield et al.
SAE Paper #760201, 1976, Gandhi et al.

Primary Examiner—W. J. Shine
Attorney, Agent, or Firm—Joseph W. Malleck; Roger L. May

[57] ABSTRACT

A catalyst having high temperature (800°–1050° C.) stability and improved three-way automotive exhaust gas catalyst activity at high temperatures, comprising an outer catalytic coating of binary La-Pd oxide ($La_2Pd_2O_5$ or $La_4PdO_7$) calcined and supported on a catalyst-supporting substrate, the oxide being present in an amount to provide 15–150 g of Pd per cubic foot of the substrate A method of making binary La-Pd oxides useful as an automotive exhaust catalyst operative at high temperatures, comprising heating in an oxidizing atmosphere a mixture containing La compounds and Pd compounds in a La:Pd ratio of 1:1 or 4:1, the heating being staged to first heat slowly from about 50° C. to start decomposition of the compounds and thereafter retaining the residue at an elevated temperature to stimulate growth of crystalline binary La-Pd oxides and to calcine the crystalline oxides.

A method of making an automotive catalyst by suspending binary La-Pd oxides in a sol (preferably alumina sol) and depositing and fixing such sol suspension on a substrate coated with conventional washcoats.

11 Claims, 5 Drawing Sheets

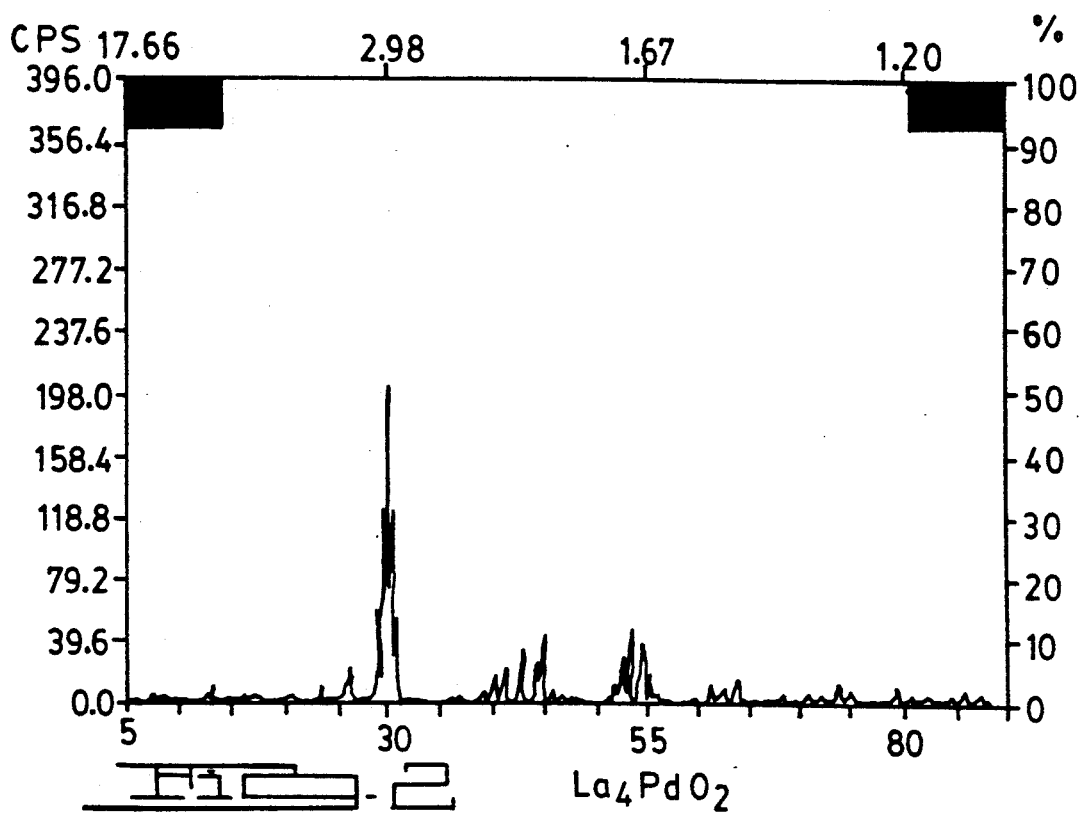
FIG. 2  $La_4PdO_2$
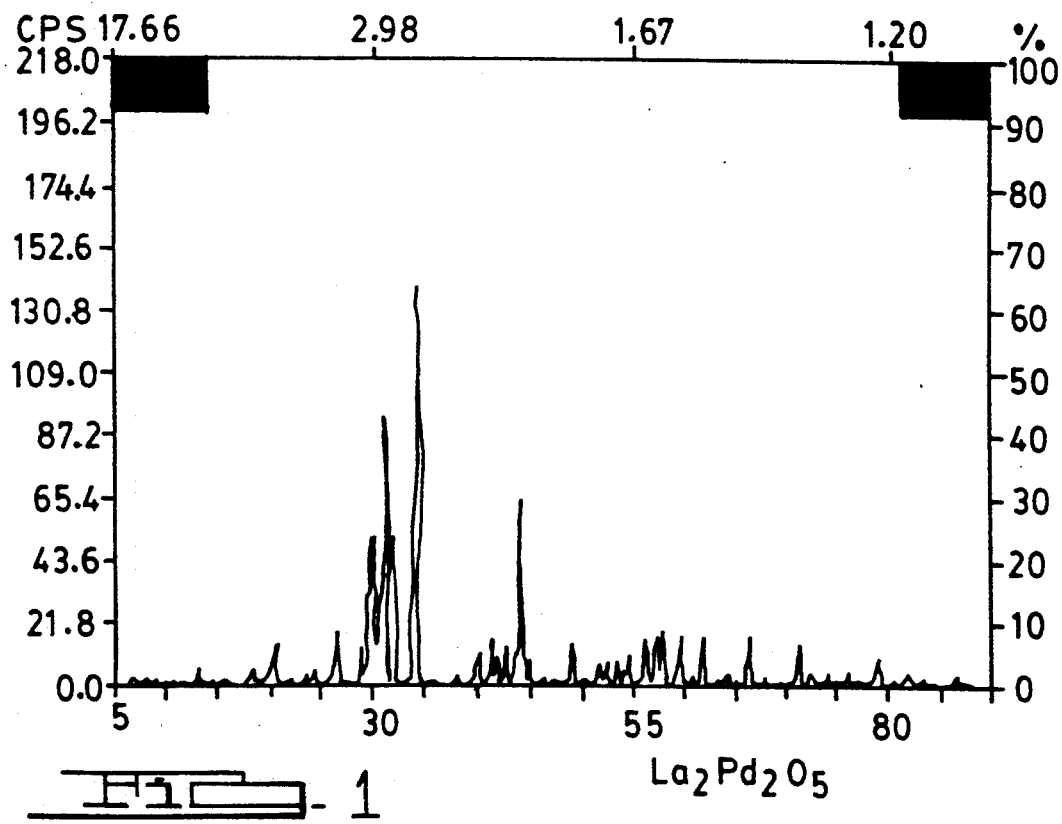
FIG. 1  $La_2Pd_2O_5$

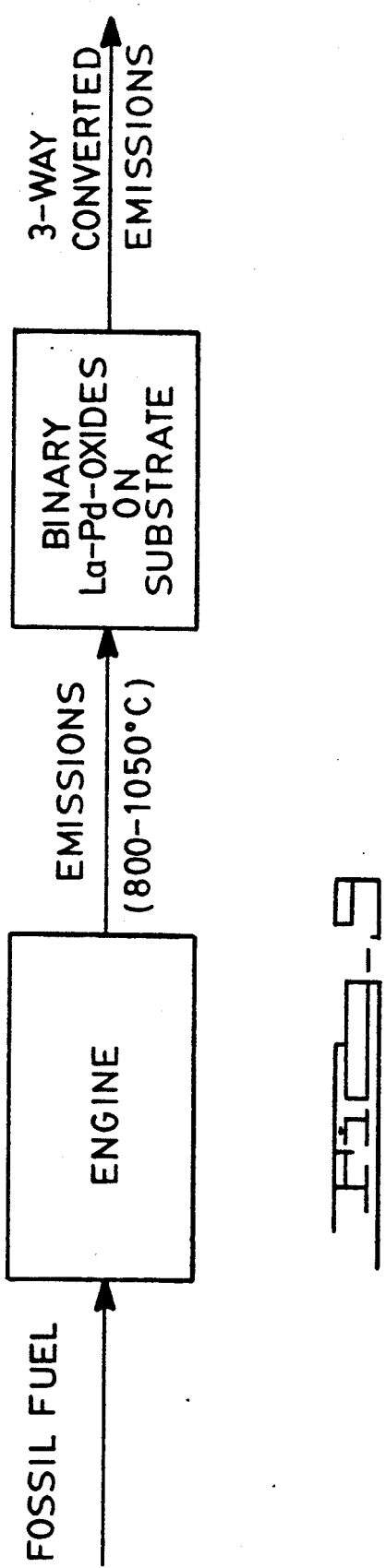

BINARY LA-PA OXIDE CATALYST AND METHOD OF MAKING THE CATALYST

BACKGROUND OF THE INVENTION

1. Technical Field

This invention relates to the technology of treating automotive emissions with catalysts to convert and remove HC, CO, and $NO_x$ content (three-way), and more particularly to the technology for treating high temperature exhaust gases (i.e., 800°–1050° C.) such as may be emitted from truck engines.

2. Discussion of the Prior Art

Lanthanum precious metal oxides, other than La-Pd-oxides, have been experimented with for purposes other than for directly enhancing activity of automotive exhaust catalysts. For example, in U.S. Pat. No. 4,127,510, $LaRhO_3$ was added as a coating to an automotive exhaust catalyst to prevent Rh enrichment during use under oxidizing conditions and relatively low exhaust gas temperatures. Such coating composition of this reference will not and did not achieve the enhancement in three-way catalytic activity sought by this invention at exhaust temperatures of 900°–1050° C., whether the engine is run at fuel-lean or fuel-rich conditions.

Laboratory creation of binary La-Pd-oxides is known (see Attfield J. P., Acta Crystallography, Vol. B44, p. 563, 1988; and Attfield J. P., Ferey G., Journal Solid State Chem., Vol. 80, p. 286, 1989). But, such chemical preparation did not appreciate the effectiveness of such binary oxides to catalyze the conversion of noxious elements of automotive exhaust gases which are at temperatures considerably different than those encountered in the laboratory.

Elements for the creation of such binary oxides (La-Pd-oxides) have been present in mechanical mixtures of $La_2O_3$ and palladium, both used as mixed phases of a coating for an automotive exhaust catalyst. However, such mechanical mixture is not stable at temperatures of 900°–1050° C. and does not lead to formation of binary La-Pd-oxides during automotive catalyst use.

SUMMARY OF THE INVENTION

The invention uses the binary oxides of $La_2Pd_2O_5$ and $La_4PdO_7$ to oxidize HC, CO, and $NO_x$ at a high temperature in an automotive catalyst environment. The result is a low-cost catalyst use having high temperature stability and improved three-way automotive exhaust catalyst activity at such high temperatures. The catalyst comprises an outer catalytic coating of binary La-Pd-oxide ($La_2Pd_2O_5$ or $La_4PdO_7$) calcined and supported on a catalyst-supporting substrate, the oxide being present in an amount to provide 15–150 g. of Pd per ft$^3$ of the substrate.

Another aspect of this invention is a method of making binary La-Pd-oxides useful as an automotive exhaust catalyst operative at high temperatures, such method comprising heating, in an oxidizing atmosphere, a mixture containing La compounds and Pd compounds in a La:Pd ratio range of 1:1 to 4:1, the heating being staged to first heat slowly from about 50° C. to start decomposition of the compounds, and thereafter to retain the residue at elevated temperatures to stimulate the growth of crystalline La-Pd-oxides and to calcine the crystalline oxides. The lanthanum and palladium compounds may respectively be lanthanum nitrates and palladium nitrates. The oxidizing atmosphere may be provided by air or oxygen; the elevated temperature to which such mixture is heated is in the range of 900°–1075° C.

Still another aspect of this invention is a method of making an automotive catalyst; the binary lanthanum and palladium oxides are applied to an automotive exhaust catalyst by suspending the binary oxides in a sol, preferably an alumina sol, and depositing such sol on the catalyst substrate coated with conventional washcoats familiar to workers in the field. Other suitable sols, such as $SiO_2$, $TiO_2$, $ZrO_2$, etc., and mixtures thereof, can also be used instead of alumina sol for this purpose. Upon drying, the sols form a gel, trapping the binary La-Pd-oxides, which oxides are thereafter sintered and locked in place.

Yet another aspect of this invention is a method of using or treating fossil fuel automotive engine exhaust gases, comprising exposing deposits of binary La-Pd-oxide particles to a flow of such exhaust gases which possess a temperature in the range of 800°–1050° C., whereby conversion of $NO_x$ will be at least 95% when the engine operates in the R range of 0.95–1.6%.

BRIEF DESCRIPTION OF THE DRAWINGS

FIGS. 1–2 are x-ray powder diffraction patterns for identifying $La_2Pd_2O_5$, $La_4PdO_7$, and $La_2O_3+PdO$, respectively;

FIGS. 7–8 are graphical illustrations similar to those of FIGS. 5–6, but for $La_4PdO_7$; and FIG. 9 is a schematic illustration of the method of use and the catalyst arrangement of this invention.

DETAILED DESCRIPTION AND BEST MODE

Figure 4:
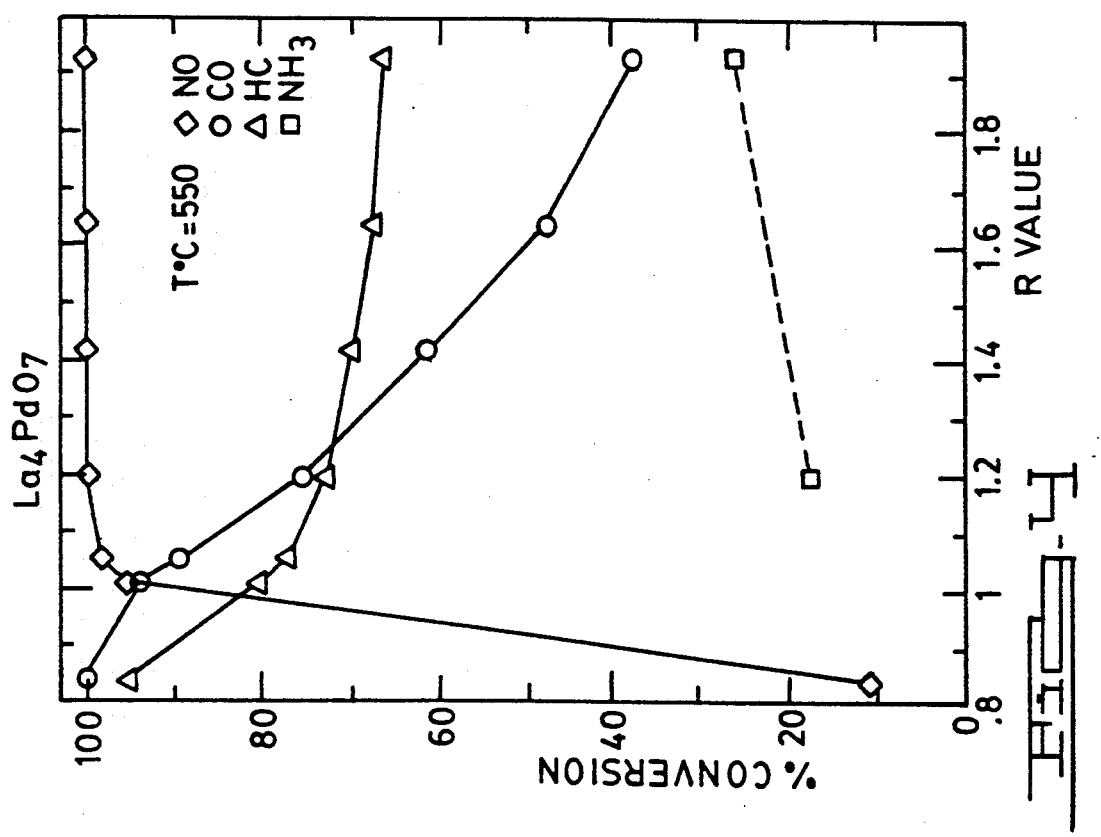
FIGS. 3–4 are graphical illustrations of the percent conversion efficiency of a gas species as a function of R value (ratio of reducing to oxidizing components in the exhaust gas) depicting the effectiveness of $La_2PdO_5$ and $La_4PdO_7$ at an exhaust gas temperature of 550° C., which is deemed below high temperatures for this invention.

As shown in FIG. 9, a first aspect of this invention is a low-cost catalyst having high temperature stability and improved three-way automotive exhaust gas catalyst activity at such high temperatures. The catalyst comprises an outer catalytic coating of binary La-Pd-oxides ($La_2Pd_2O_5$ or $La_4PdO_7$) calcined and supported on a catalyst-supporting substrate such as, but not limited to, $Al_2O_3$, $ZrO_2$, $SiO_2$, or $TiO_2$; the binary oxide is present in an amount of about 15–150 g. of Pd per ft$^3$.

The binary La-Pd-oxides employed are produced by a method which makes such oxides useful as an automotive engine exhaust catalyst operative at high temperatures. Such method of making comprises heating a mixture containing lanthanum compounds and palladium compounds in a La:Pd ratio of 1:1 to 4:1, the heating being staged to first heat slowly the compounds from about 50° C. to an elevated temperature that decomposes the compounds and stimulates growth of crystalline binary La-Pd oxide by solid-state reaction; thereafter, the reaction mixtures are retained at the elevated temperature for a period of 10–50 hours to complete the reaction and calcine the crystalline oxides, which is then followed by slow cooling.

The elevated temperature to which the compounds are heated is in the range of 900°-1075° C. and preferably 900° C. for $La_2Pd_2O_5$ and about 1050° C. for $La_4PdO_7$. At temperatures about 130° C., the reaction mixture forms a melt and slow heating at a first stage to prevent the flow of the melt and allow evolved nitrogen oxides to diffuse out of the reaction chamber. If the temperature to which said compounds is heated is less than such prescribed temperatures, reaction will not be complete in a reasonable period of time and the products will be contaminated with parent oxides. Temperatures above 1075° C. are not necessary and could cause disproportionation, resulting in mixing of parent oxides and binary oxides.

The lanthanum and palladium compounds may respectively be lanthanum nitrates and palladium nitrates. The oxidizing atmosphere may be provided by air or oxygen, and the elevated temperature to which said mixture is heated is in the range of 900°-1075° C.

The binary oxide of interest to this invention are preferably prepared by combining their nitrate salts, pyrolyzing them in a mixture, and calcining at a temperature to produce the particular crystalline phase desired. It is also possible to prepare these oxides from other inorganic and organic salts of lanthanum and palladium. For example, it is possible to make such oxide from a mixture of lanthanum oxylate and palladium dimethylglyoximate in proper ratios. The ability to obtain either $La_2Pd_2O_5$ or $La_4PdO_7$ depends on the ratio of oxides mixed to form proper phases and calcining temperature after decomposition.

Preferably, a mixture of lanthanum nitrate (0.94 grams) and palladium nitrate hydride (0.55 grams) is placed in a tube furnace and slowly heated to about 130° C. for about 30 minutes. The temperature is then raised to 900° C. and maintained for about 12 hours to produce a light-yellow powder. X-ray diffraction of such yellow powder shows it to have a pattern as that shown in FIG. 1. The ratio of lanthanum nitrate to palladium nitrate should be such that the La:Pd ratio is 1:1. The purity of such compounds is at least 99% and the BET surface area of the powder is 7.4 m$^2$/g.

Advantageously, the binary La-Pd oxide may be applied to a method of making an automotive catalyst by suspending the binary oxides in a sol, preferably alumina sol, and depositing such suspension in sol on the substrate coated with conventional washcoats familiar to workers in the field. Such substrate may be substituted of a material selected from the group consisting of $Al_2O_3$, $SiO_2$, $ZrO_2$, CaO, MgO, and BaO. Other suitable sols such as $SiO_2$, $TiO_2$, $ZrO_2$, etc., and mixtures thereof (but not limited to), can also be used instead of alumina sol for this purpose. Upon drying, the sols form gels, trapping the binary La-Pd oxide, which are thereafter sintered to lock in place.

Still another aspect of this invention is a method of using or treating fossil fuel automotive engine exhaust gases using such binary La-Pd oxide. Such method comprises exposing binary La-Pd oxide, deposited on a catalyst substrate, to a flow of such exhaust gases which possess a temperature in the range of 800°-1050° C., whereby conversion of $NO_x$ will be at least 95% when the engine is operated in the R range of 0.95-1.6. Such oxides for such method, of course, should be one of $La_4PdO_7$ or $La_2Pd_2O_5$.

Examples

Samples of each of the binary La-Pd oxide were prepared and tested in automotive exhaust catalyst applications. $La_2Pd_2O_5$ was prepared by finely grinding a mixture of lanthanum-nitrate-hydrate in an amount of 0.55 g (La:Pd ratio 1:1) and heating at 130° C. for about 30 minutes followed pyrolysis by raising temperature slowly to 700° C. Upon calcining at 900° C. for 12 hours, the formation of $La_2Pd_2O_5$ takes place. The sample was analyzed by x-ray powder diffraction studies as shown in FIG. 1. The resulting oxide was light-yellow in color and had a surface area of 7.4 m$^2$/g.

$La_4PdO_7$ samples were prepared by combining 0.55 g of palladium-nitrate-hydrate and 3.76 g of lanthanum-nitrate-hydrate (La:Pd ratio 4:1), grinding to a fine powder, and pyrolyzing in a tube furnace having an inert atmosphere by increasing temperature slowly from 50° C. to 1050° C. and maintaining at 1050° C. for about 50 hours. The tetralanthanum-palladium-oxide sample was analyzed by x-ray powder diffraction studies as shown in FIG. 2. The resulting tetralanthanum-palladium-oxide was light-brown in color and had a BET surface area of 4.5 m$^2$/g.

It was found that $La_2O_3$ and PdO are formed during thermal decomposition of the nitrate salts and do not react even after heating at 700° C. $La_2Pd_2O_5$ formed on heating the reaction mixture at 900° C. The reaction scheme for $La_2Pd_2O_5$ is as follows:

$$2\ La(NO_3)_3 \cdot 6H_2O + 2Pd(NO_3)_2 \cdot xH_2O \xrightarrow{130°\ C.} Melt$$

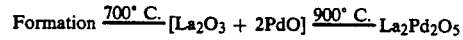

$$\text{Formation} \xrightarrow{700°\ C.} [La_2O_3 + 2PdO] \xrightarrow{900°\ C.} La_2Pd_2O_5$$

When the ratio of lanthanum nitrate is shifted such that La:Pd ratio is 4:1, and the decomposition products of the nitrates are heated to a temperature of 1050° C. for 50 hours, La is formed. The high temperature required for making these binary oxides shows that these materials are not formed during the processing of catalyst containing a mixture of lanthanum and palladium oxides.

It was found that during the synthesis of such selected binary oxides they do not form in the presence of metal oxides of Group IVb. For example, if a mixture of zirconium-nitrate-hydrate, lanthanum-nitrate-hydrate and palladium-nitrate-hydrate is pyrolyzed and calcined at 900° C., the x-ray powder diffraction pattern of the product shows it to be a mixture of zirconium oxide, lanthanum oxide, and palladium oxides. Binary oxides did not form even after calcining at 1050° C.

Initial efforts to deposit the binary La-Pd oxide catalysts from their suspension in water followed by sintering resulted in the loss of lanthanum-palladium-oxides. The problem is solved by depositing such oxides from their suspension in an alumina sol on a honeycomb substrate precoated with a commercial washcoat such as γ-alumina. The alumina sol for this purpose can be readily prepared by hydrolyzing aluminum sec-butoxide in water at 70°-90° C., boiling off sec-butanol at 90° C., and acidifying. Two different samples were made by suspending the individual binary oxides ($Al_2Pd_2O_5$ or $La_4PdO_7$) in such sols and depositing such suspension onto a catalyst substrate (such as monolithic cellular cordierite) which had been previously coated with a commercial washcoat such as γ-alumina. On drying, alumina sol forms a gel and traps the particles of the binary lanthanum-palladium-oxide. The catalyst is then sintered at 600° C.

The detailed testing procedure and apparatus for catalytic activity essentially comprises subjecting each individual catalyst to an exhaust flow that simulates the exhaust gas from a fossil fuel engine (such as described in SAE paper 760201, SAE Transactions 1976, by Gandhi et al). The emissions were tested for CO and propane oxidation and NO reduction following exposure to the particular catalyst sample. The conversion efficiency for the emission species, such as NO, CO, CH, or $NH_3$, was tested as a function of R value. R is obtained by dividing the sum of equivalent reducing components of the mixture by the sum of the oxidizing components, and can be calculated from the following formula:

$$R = \frac{PCO + PH_2 + {}^{3n}PC_nH_{2n} + {}^{3.33n}PC_nH_{2n+2}}{PNO + {}^{2}PO_2}$$

When R is equal to one, the gas emissions are considered to be stoichiometric mixture. When R value exceeds one, the gas emission is considered to be rich.

Figure 3:
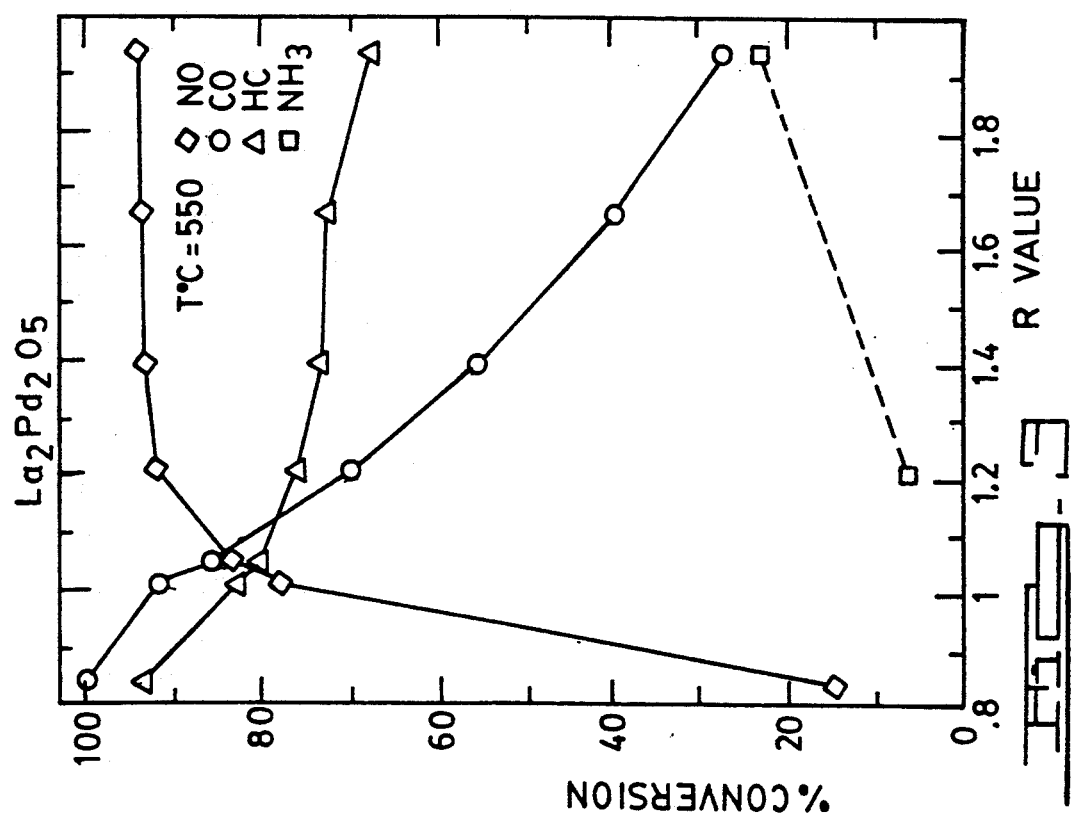
Figure 6:
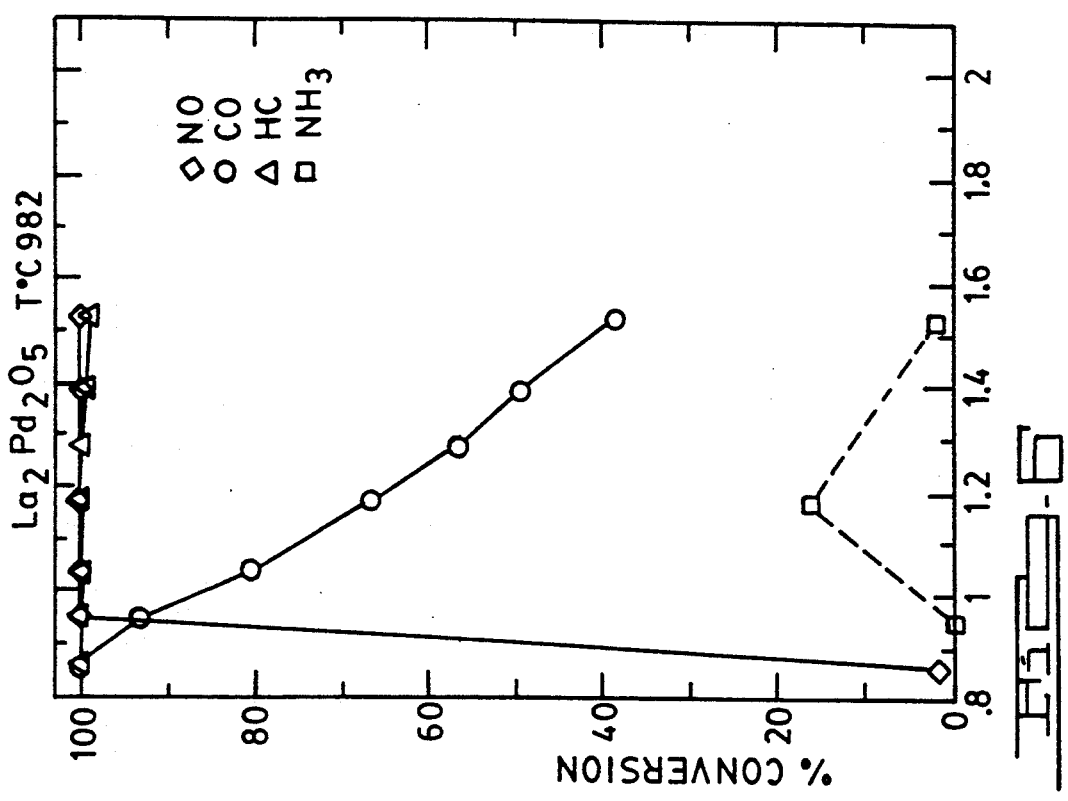
FIGS. 5–6 are graphical illustrations of the percent conversion efficiency of exhaust gas species as a function of R for $La_2Pd_2O_5$ at 850° C. and at 982° C., respectively.
Figure 5:
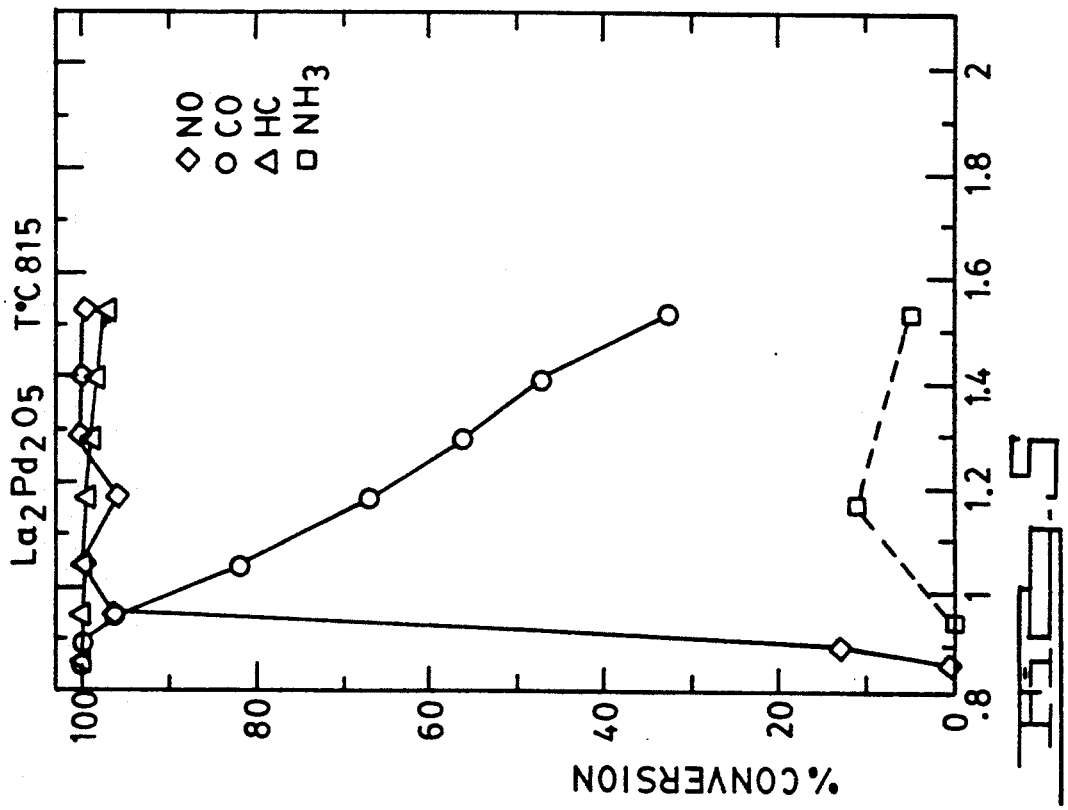
Figure 6:
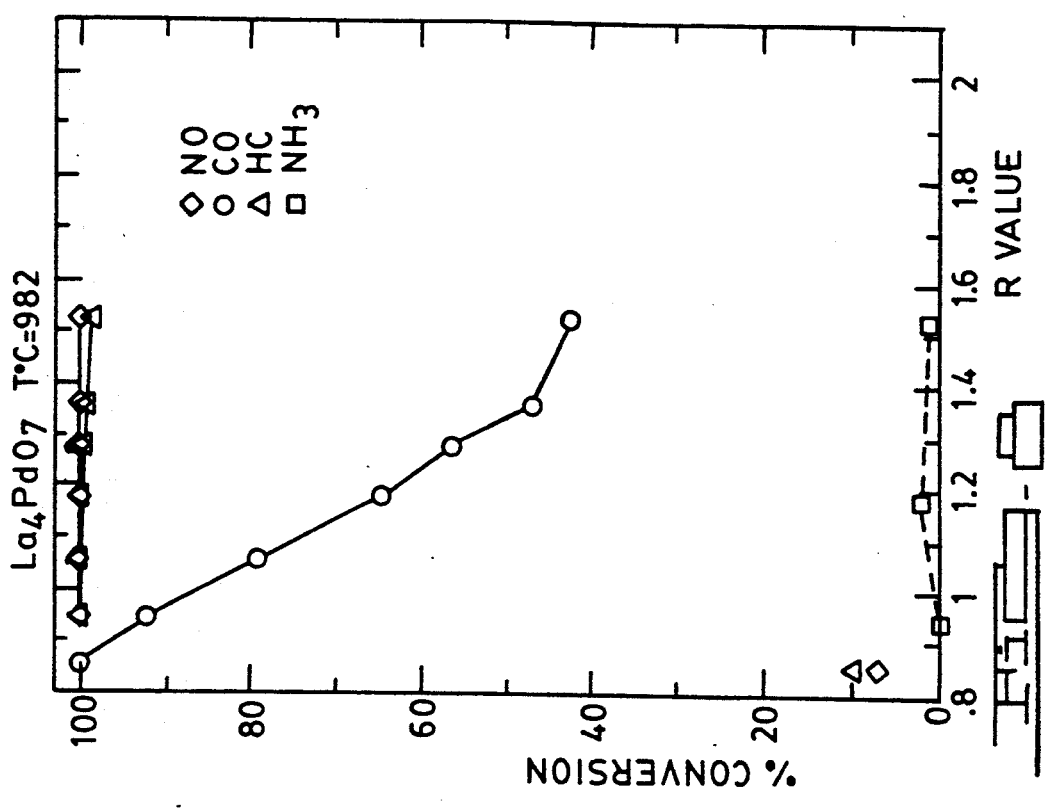
Figure 7:
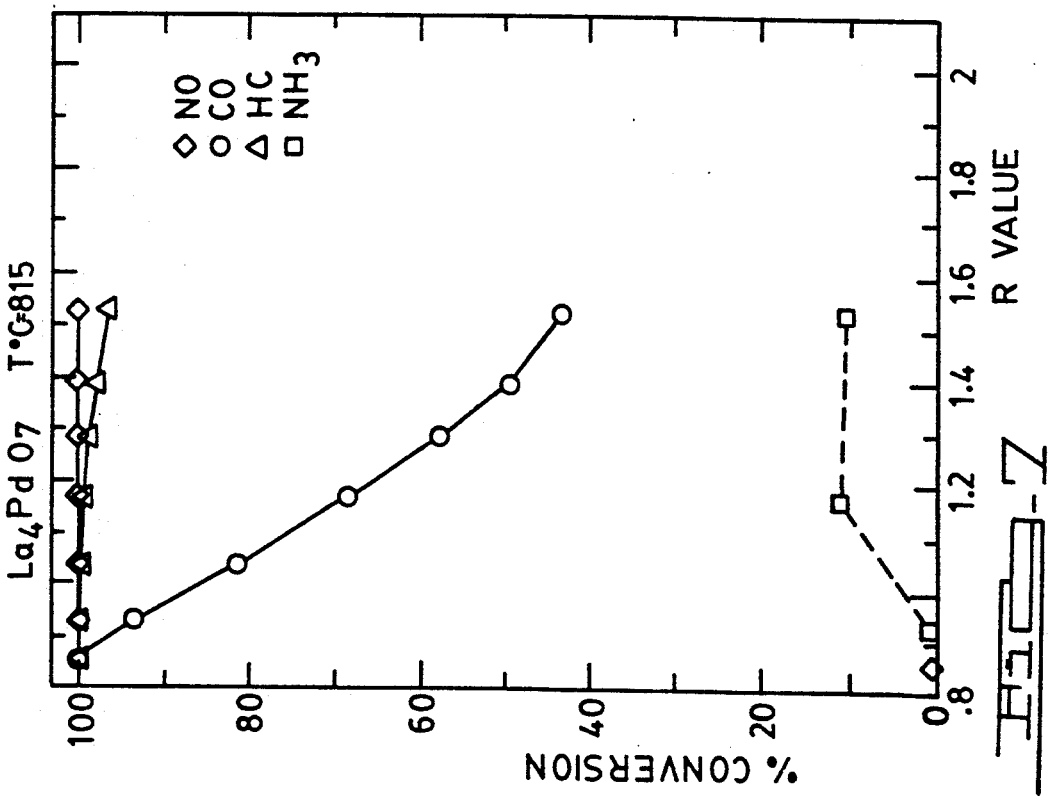

The R-curves for the samples tested at 550° C. are shown in FIGS. 3–4. R-curves for $La_2Pd_2O_5$ (FIGS. 5–6) and $La_4PdO_7$ (FIGS. 7–8) tested at 815° C. and 982° C. are shown in FIGS. 5–8. The regions of interest are in the vicinity of R=1 and results at R=1 are described as follows.

Samples were subjected to gas exhaust emissions at a temperature of 550° C. at steady-state exhaust gas conditions. $La_2Pd_2O_5$ converts 78% $NO_x$, 82% hydrocarbons, and 92% CO. $La_4PdO_7$, on the other hand, converts 80% $NO_x$, 94% CO, and 96% hydrocarbons.

Both oxides $La_2Pd_2O_5$ and $La_4PdO_7$ convert hydrocarbons quantitatively at 815° C. and 982° C. $La_2Pd_2O_5$ converts 98% NO at 815° C., but conversion becomes quantitative at 982° C. $La_4PdO_7$, on the other hand, converts NO quantitatively at both temperatures. The conversion of CO is 85% for both oxides operating at 815° C. or 982° C.

It was found that $La_2O_3$ and PdO are formed during thermal decomposition of the nitrate salts. Further heating at 700° C did not cause reaction of the oxides, but $La_2Pd_2O_5$ formed on heating the reaction mixture at 900° C. The reaction scheme for $La_2Pd_2O_5$ is as follows:

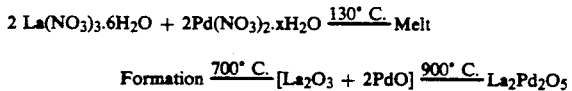

$$2 La(NO_3)_3 \cdot 6H_2O + 2Pd(NO_3)_2 \cdot xH_2O \xrightarrow{130° C.} Melt$$

$$Formation \xrightarrow{700° C.} [La_2O_3 + 2PdO] \xrightarrow{900° C.} La_2Pd_2O_5$$

When the ratio of lanthanum nitrate to palladium nitrate is shifted such that La:Pd ratio is approximately 2:1, and the nitrates are heated to a temperature of 1050° C. for 50 hours, $La_4PdO_7$ is formed. The high temperature heating required for making these binary oxides shows that these materials are not formed during the processing of catalysts containing a mixture of lanthanum and palladium oxides. In addition, alumina of the washcoat material reacts preferentially at the low temperatures to form solid solutions with lanthanum oxide due to the similarity of structure, and at elevated temperatures, lanthanum aluminate is formed.

We claim:

1. A low-cost catalyst having high temperature stability and high three-way automotive exhaust gas catalyst activity at such high temperatures, comprising:
   (a) an outer catalytic coating of binary La-Pd oxide selected from the group consisting of $La_2Pd_2O_5$ and $La_4PdO_7$, calcined and supported on a catalyst-supporting substrate, said oxide being present in an amount to provide 15–150 g of Pd per cubic foot of the substrate.

2. The catalyst as in claim 1, in which said substrate is constituted of a material selected from the group consisting of $Al_2O_3$, $SiO_2$, $ZrO_2$, CaO, MgO, and BaO.

3. The catalyst as in claim 1, in which said high temperatures are in the range of 800°–1050° C.

4. A method of making binary La-Pd oxide selected from the group consisting of $La_2Pd_2O_5$ and $La_4PdO_7$ operative as a catalyst at high temperatures, comprising: heating a mixture containing La compounds and Pd compounds in a La:Pd ratio of 1:1 or 4:1, said heating being staged to first heat slowly from about 50° C. to an elevated temperature that decomposes said compounds and stimulates growth of said oxide in crystalline form by solid state reaction, and thereafter retaining said elevated temperature for a period of 10–50 hours to complete said solid-state reaction and calcine said crystalline oxides, followed by slow cooling.

5. The method as in claim 4, in which said compounds are nitrates.

6. The method as in claim 4, in which said heating is carried out in an oxidizing atmosphere provided by air or oxygen.

7. The method as in claim 4, in which said elevated temperature is in the range of 900°–1075° C.

8. The method as in claim 4, in which the selection of La:Pd ratio and calcining temperature determines the type of binary La-Pd oxide obtained.

9. A method of making a catalyst suitable for automotive applications, comprising:
   (a) suspending binary La-Pd oxide selected from the group consisting of $La_2Pd_2O_5$ and $La_4PdO_7$ in a sol;
   (b) depositing sol suspension on a catalyst substrate;
   (c) drying the deposit to form a gel; and
   (d) sintering said gel to lock in place said oxide on said substrate.

10. The method as in claim 9, in which said sol is selected from the group of sols having $Al_2O$, $SiO_2$, $TiO_2$, or $ZrO_2$.

11. The method as in claim 9, in which said sol is alumina sol prepared by hydrolyzing aluminum sec-butoxide in water at 70°–90° C., boiling off sec-butanol, and thereafter acidifying said sol.

* * * * *